US008255085B2

(12) United States Patent
Salsbury (10) Patent No.: US 8,255,085 B2
(45) Date of Patent: Aug. 28, 2012

(54) ASYMMETRICAL CONTROL SYSTEM AND METHOD FOR ENERGY SAVINGS IN BUILDINGS

(75) Inventor: Timothy Salsbury, Whitefish Bay, WI (US)

(73) Assignee: Johnson Controls Technology Company, Holland, MI (US)

( * ) Notice: Subject to any disclaimer, the term of this patent is extended or adjusted under 35 U.S.C. 154(b) by 653 days.

(21) Appl. No.: 12/366,603

(22) Filed: Feb. 5, 2009

(65) Prior Publication Data

US 2010/0198370 A1 Aug. 5, 2010

(51) Int. Cl.
*G05B 21/00* (2006.01)
*G05D 23/00* (2006.01)
*F24F 11/00* (2006.01)

(52) U.S. Cl. ......... 700/276; 700/46; 700/277; 700/278; 700/299; 700/300; 165/238; 165/254; 165/244; 165/258; 165/287; 236/1 B; 236/1 C (58) Field of Classification Search ............... 700/46, 700/276
See application file for complete search history.

(56) References Cited

U.S. PATENT DOCUMENTS

| | | | | | |
|---|---|---|---|---|---|
| 3,870,227 | A | * | 3/1975 | Attridge, Jr. | 236/1 B |
| 4,347,712 | A | * | 9/1982 | Benton et al. | 236/49.3 |
| 4,442,972 | A | * | 4/1984 | Sahay et al. | 236/1 EA |
| 4,711,394 | A | * | 12/1987 | Samuel | 236/49.3 |
| 4,754,919 | A | * | 7/1988 | Otsuka et al. | 236/49.3 |
| 4,819,714 | A | * | 4/1989 | Otsuka et al. | 700/276 |
| 5,364,304 | A | * | 11/1994 | Hampton | 236/49.3 |
| 6,219,590 | B1 | * | 4/2001 | Bernaden et al. | 700/277 |
| 6,688,384 | B2 | * | 2/2004 | Eoga | 236/1 B |
| 7,188,779 | B2 | * | 3/2007 | Alles | 700/277 |
| 7,261,241 | B2 | * | 8/2007 | Eoga | 236/1 B |
| 7,274,975 | B2 | * | 9/2007 | Miller | 700/295 |
| 7,341,201 | B2 | * | 3/2008 | Stanimirovic | 236/49.1 |
| 7,551,983 | B2 | * | 6/2009 | Attridge, Jr. | 700/277 |
| 7,726,582 | B2 | * | 6/2010 | Federspiel | 700/276 |
| 7,766,246 | B2 | * | 8/2010 | Mulhouse et al. | 236/49.3 |

(Continued)

OTHER PUBLICATIONS

Curtiss, P.S.; Kreider, J.F.; and Brandermeuhl, M.J., "Local and Global Control of Commercial Building HVAC Systems Using Artificial Neural Networks", Jun. 1994, Proceedings of the American Control Conference.*

(Continued)

*Primary Examiner* — Mohammad Ali
*Assistant Examiner* — Kelvin Booker
(74) *Attorney, Agent, or Firm* — Foley & Lardner LLP (57) ABSTRACT

A method for controlling a controlled variable of a building zone to minimize an error between the controlled variable and a setpoint includes receiving an input at a first interface regarding the controlled variable from a sensor provided in the building. The method further includes using a processing circuit to determine a sign of the error based on the input and the setpoint. The method yet further includes using the processing circuit to cause a controller configured to affect the controlled variable to respond to the error at a first rate when a first sign of the error is present. The method further includes using the processing circuit to cause the controller to respond to the error at a second rate when a second sign of the error is present, the first rate being slower than the second rate. The first sign of the error can be associated with a high energy expenditure required to minimize the error relative to an energy expenditure required to minimize the error relative to the second sign.

7 Claims, 7 Drawing Sheets

U.S. PATENT DOCUMENTS

| | | | |
|---|---|---|---|
| 7,890,215 B2* | 2/2011 | Duncan | 700/276 |
| 7,918,407 B2* | 4/2011 | Patch | 236/49.3 |
| 7,966,104 B2* | 6/2011 | Srivastava et al. | 700/299 |
| 7,979,163 B2* | 7/2011 | Terlson et al. | 700/276 |
| 8,027,742 B2* | 9/2011 | Seem et al. | 700/38 |
| 2003/0216837 A1* | 11/2003 | Reich et al. | 700/276 |
| 2004/0238653 A1* | 12/2004 | Alles | 236/49.3 |
| 2005/0194455 A1* | 9/2005 | Alles | 236/1 B |
| 2006/0004492 A1* | 1/2006 | Terlson et al. | 700/276 |
| 2006/0032624 A1* | 2/2006 | Edwards | 165/208 |
| 2006/0091227 A1* | 5/2006 | Attridge | 236/1 B |
| 2006/0161306 A1* | 7/2006 | Federspiel | 700/276 |
| 2007/0043478 A1* | 2/2007 | Ehlers et al. | 700/276 |
| 2007/0225868 A1* | 9/2007 | Terlson et al. | 700/276 |
| 2008/0277486 A1* | 11/2008 | Seem et al. | 236/49.3 |
| 2008/0281439 A1* | 11/2008 | Salsbury | 700/278 |
| 2008/0294291 A1* | 11/2008 | Salsbury | 700/277 |
| 2009/0005912 A1* | 1/2009 | Srivastava et al. | 700/276 |
| 2009/0083583 A1* | 3/2009 | Seem et al. | 714/39 |
| 2009/0308941 A1* | 12/2009 | Patch | 236/49.3 |
| 2010/0006662 A1* | 1/2010 | Yonezawa et al. | 700/276 |
| 2010/0306001 A1* | 12/2010 | Discenzo et al. | 706/46 |
| 2011/0031322 A1* | 2/2011 | Zou et al. | 236/1 B |
| 2011/0077758 A1* | 3/2011 | Tran et al. | 700/276 |
| 2011/0137468 A1* | 6/2011 | Duncan | 700/277 |
| 2011/0320045 A1* | 12/2011 | Salsbury et al. | 700/276 |

OTHER PUBLICATIONS

Nassif, N.; Kajls, S.; and Sabourin, R., "Optimization of HVAC Control System Strategy Using Two-Objective Genetic Algorithms", Jul. 2005, HVAC&R Research, vol. 11, No. 3.*

Seem, J.E.; House, J.M.; and Monroe, R.H., "Online Monitoring and Fault Detection of Control System Performance", Aug. 1997, Proceedings of the CLIMA 2000 Conference.*

Seem, J.; Park, C.; and House, J.M., "A New Sequencing Control Strategy for Air Handling Units", Jan. 1999, HVAC&R Research, vol. 5, No. 1.*

Åström, K. et al., *PID Controllers: Theory, Design, and Tuning*, $2^{nd}$ Edition, 1995, published by Instrument Society of America, Research Triangle Park, NC.

* cited by examiner

ASYMMETRICAL CONTROL SYSTEM AND METHOD FOR ENERGY SAVINGS IN BUILDINGS

BACKGROUND

The present application generally relates to building automation systems and methods. The present application relates more specifically to asymmetrical control of control loops for building automation systems and methods.

Buildings and building areas typically include systems and devices that are controlled to meet setpoints for one or more controlled variables. A common example is a temperature inside a room that is controlled to a setpoint using a feedback loop. Energy is expended when equipment such as a heating system or a cooling system is used to bring the temperature conditions to the setpoint. It is desirable to improve the efficiency of building systems without occupants of the building becoming too uncomfortable.

SUMMARY

The invention relates to a method for controlling a controlled variable of a building zone to minimize an error between the controlled variable and a setpoint. The method includes receiving an input at a first interface regarding the controlled variable from a sensor provided in the building. The method further includes using a processing circuit to determine a sign of the error based on the input and the setpoint. The method yet further includes using the processing circuit to cause a controller configured to affect the controlled variable to respond to the error at a first rate when a first sign of the error is present. The method further includes using the processing circuit to cause the controller to respond to the error at a second rate when a second sign of the error is present, the first rate slower than the second rate. The first sign of the error can be associated with a high energy expenditure required to minimize the error relative to the second sign. The controlled variable can be, for example, temperature, compressor speed, water flow rate, air flow rate, etc.

The invention further relates to a system for controlling a controlled variable of a building zone to minimize an error between the controlled variable and a setpoint. The system includes a processing circuit configured to respond to the error at a first rate when a first sign of the error is present and to respond to the error at a second rate when a second sign of the error is present, wherein the response comprises providing an adjusted control signal to a controller for controlling a plant configured to affect the controlled variable.

The invention further relates to a system for controlling a temperature in a building zone relative to a setpoint to minimize a difference between the temperature and the setpoint. The difference between the temperature and the setpoint is of a first error type or a second error type. The system includes a plant configured to affect the temperature of the building zone and a controller configured to provide a control signal to the plant according to a control strategy configured to cause the temperature to approach the setpoint. The existence of the first error type results in a greater energy expenditure relative to the second error type. The system further includes a processing circuit that delays the control strategy when the first error type exists. The first error type can correspond to a first sign of the difference between the actual temperature and the setpoint. The second error type can correspond to a second sign of the difference between the actual temperature and the setpoint. The processing circuit can be part of at least one of the controller, a supervisory controller, and a device between the supervisory controller and the controller.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods configured to provide asymmetrical control of a controlled variable in a building area are described. A climate control system in a building rarely responds to a varied controlled variable with the same energy cost when the controlled variable is to one side of the setpoint relative to when the controlled variable is to the other side of the setpoint. For example, more energy can be required to cool a building when the temperature is five degrees above the setpoint than to heat the building when the temperature is five degrees below the setpoint. The present disclosure describes systems and methods for changing the response of a building system when the controlled variable is to the side of the setpoint that requires more energy to correct.

Figure 1:
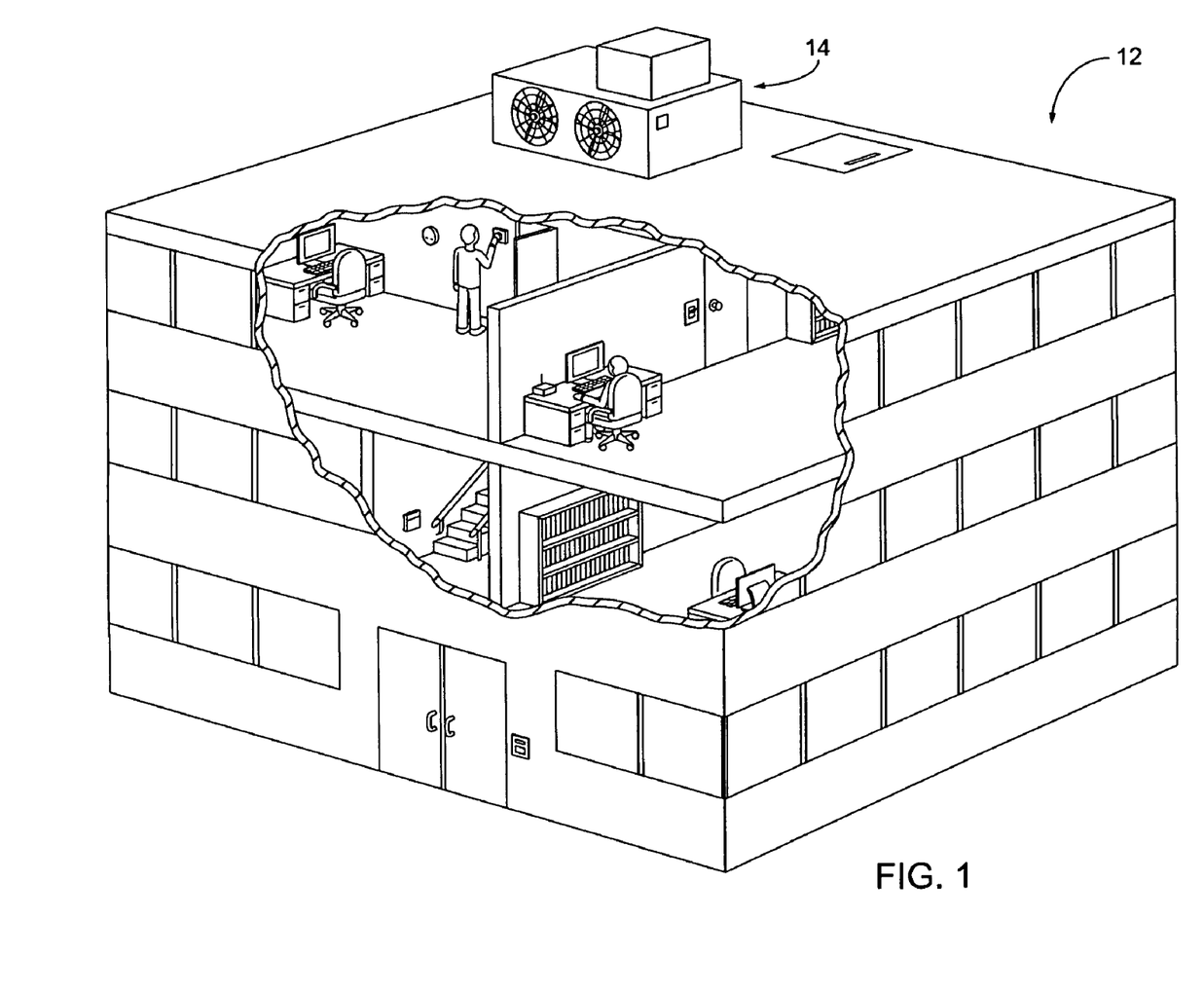
FIG. 1 is a perspective view of a building, according to an exemplary embodiment.

FIG. 1 is a perspective view of a building 12 shown to include a number of floors, rooms, spaces, zones, and/or other building structures and areas. According to various exemplary embodiments, building 12 may be any area of any size or type, including an outdoor area. The systems and methods of the present disclosure may be implemented in building 12 and/or in building systems serving building 12 (e.g., rooftop air handing unit 14 and/or a controller thereof).

Figure 2:
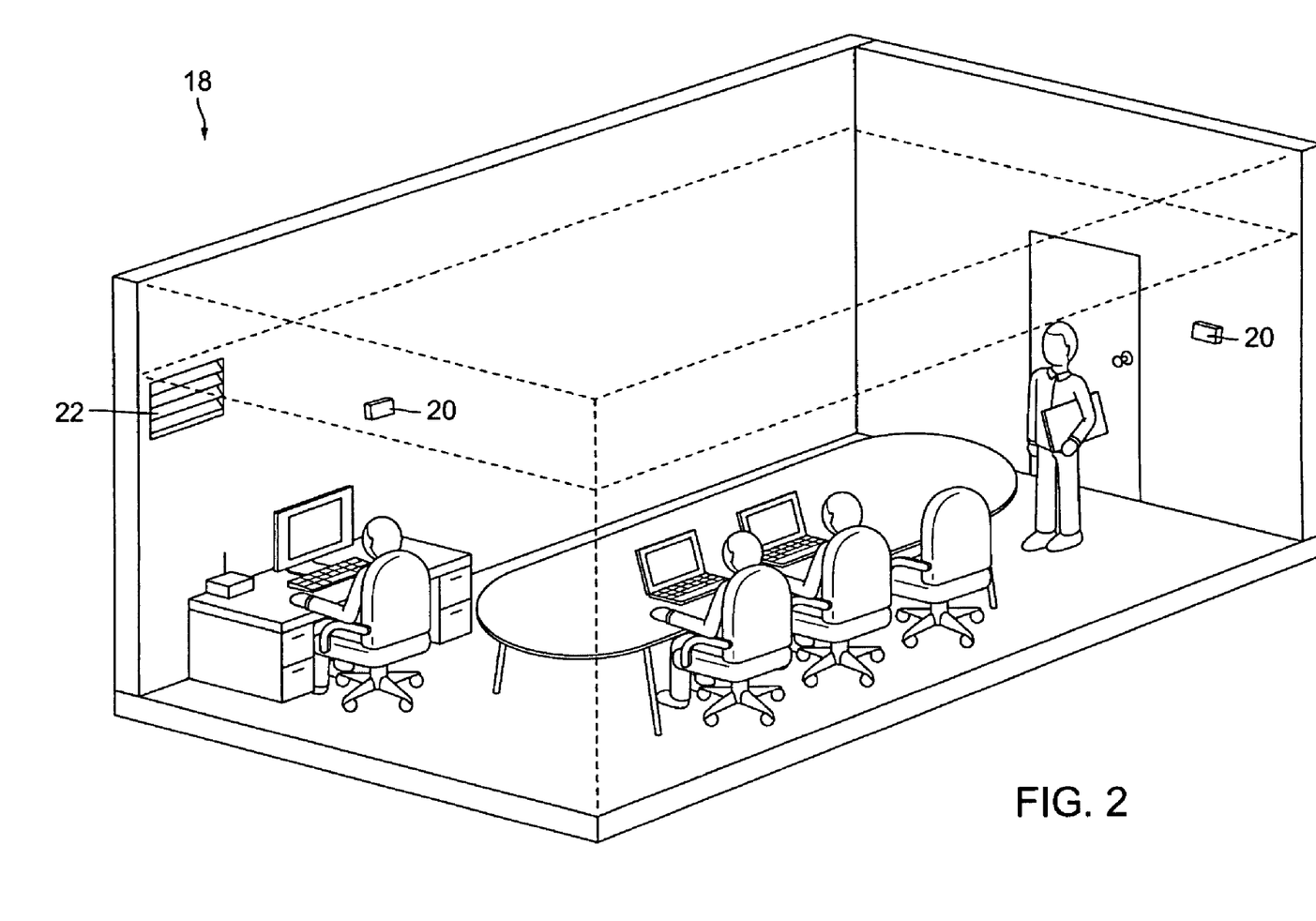
FIG. 2 is a close-up perspective view of a building zone of the building of FIG. 1, according to an exemplary embodiment.

Referring to FIG. 2, a close-up perspective view of a building zone 18 of building 12 of FIG. 1 is shown, according to an exemplary embodiment. Building zone 18 may include a heating, ventilation, and air conditioning (HVAC) vent 22 coupled to ductwork. Supply air flow or ventilation may be provided to zone 18 via vent 22. A variable air volume (VAV) box such as that shown in FIGS. 3 and 4 can be used to control the amount of warm or cool air allowed into the room via vent 22. Sensors 20 may be disposed within and/or around building zone 18 and may be configured to sense conditions within building zone 18. For example, sensors 20 may be temperature sensors, humidity sensors, air quality sensors, and/or any other type of sensor that may be configured to sense a building-related condition. Sensors 20 are shown disposed on the walls of building zone 18, but may be located, positioned, or disposed in any manner or location within building zone 18. Sensors 20 may be wireless or wired sensors configured to operate on or with any network topology.

Figure 3:
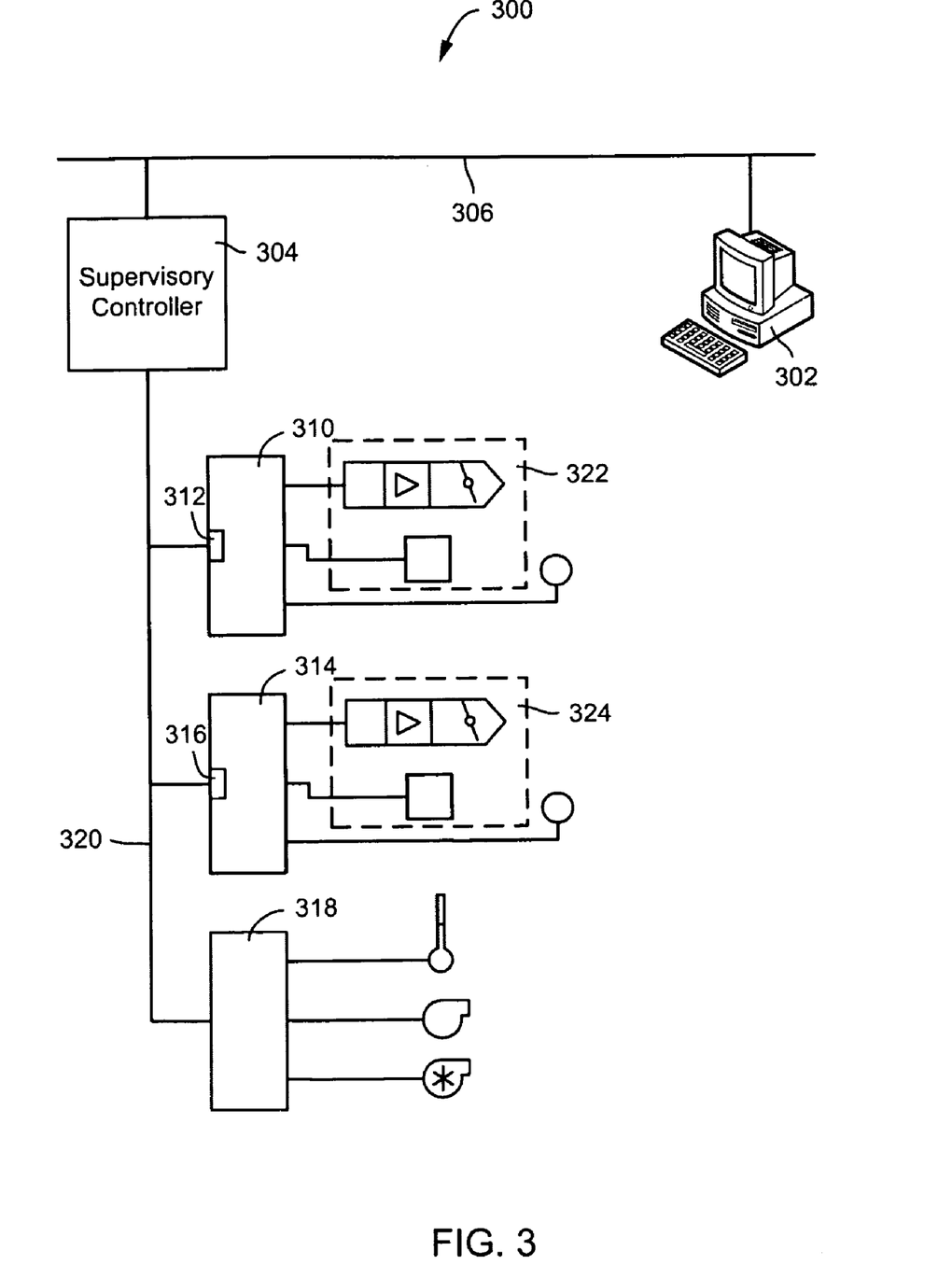
FIG. 3 is a schematic block diagram of a climate control system, according to an exemplary embodiment.

Referring to FIG. 3, a schematic block diagram of a climate control system 300 is shown, according to an exemplary embodiment. Climate control system 300 is used to control a controlled variable of a building zone (e.g., a climate condition of the building zone, a temperature, an oxygen level, an air pollutant level, a humidity level, etc.), according to an exemplary embodiment. Climate control system 300 is shown to include a workstation 302, a supervisory controller 304, and a plurality of controllers 310, 314, and 318, according to an exemplary embodiment. Controllers 310, 314, and 318 are coupled to supervisory controller 304 which may provide dynamically changing setpoints to controllers 310, 314, and 318 via communication link 320 (e.g., a building network, a wireless network, a wired network, separate communication links, etc.). Controllers 310 and 314 are shown to include communication ports 312 and 316 for coupling to communication link 320. Workstation 302 and supervisory controller 304 are shown as being communicably coupled via communication bus 306 (e.g., in-building network, wireless network, an IP network, etc.). Communication bus 306 and/or communication link 320 can be coupled to additional sections and additional controllers, as well as any other components, systems, or devices. According to one exemplary embodiment, climate control system 300 is a building automation system such as a METASYS system sold by Johnson Controls, Inc. In such an embodiment, supervisory controller 304 may be a Network Automation Engine (NAE) device sold by Johnson Controls.

Figure 4:
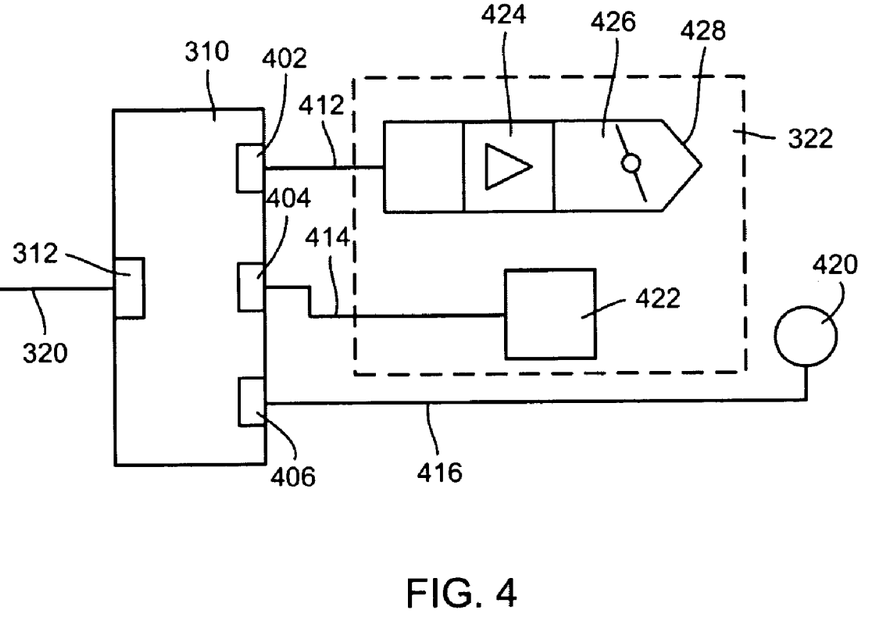
FIG. 4 is a schematic block diagram of a controller and variable air volume box of the climate control system of FIG. 3, according to an exemplary embodiment.

Referring to FIGS. 3 and 4, controller 310 is shown communicably connected to VAV box 322 and controller 314 is shown communicably connected to VAV box 324. VAV box 322 is shown to include a damper 426, an air flow sensor 424, and an actuator 422. Actuator 422 positions damper 426 based on signals provided to it from controller 310 via control line 414 and actuator output 404. The position of damper 426 controls the amount of air flow (e.g., sensed by air flow sensor 428) provided to the building zone (e.g., a room, hallway, building, a portion thereof, or other internal environment). Controller 310 receives a temperature signal from a temperature sensor 420 via control line 416 at temperature input 406.

In an exemplary embodiment, controller 310 is configured to appropriately position actuator 422 in accordance with a control algorithm. In an exemplary embodiment, the control algorithm is or includes an integral (I) based algorithm, a proportional (P) algorithm, a proportional integral (PI) algorithm, a proportional derivative (PD) algorithm, a proportional-integral derivative (PID) algorithm, and/or any feedback logic control algorithm. In accordance with the algorithm, at every cycle controller 310 receives, for example, the temperature value at input 406 and provides an actuator control signal at actuator output 404 to position damper 426 in a manner that is calculated to bring the controlled variable (e.g., the temperature value) to a setpoint. Controller 310 can also cyclically respond to the air flow value. According to various exemplary embodiments, the system can utilize temperature, humidity, flow rate, pressure, and/or any other available input to assist in calculating an optimal actuator position.

According to an exemplary embodiment, controller 310 is configured to include a control strategy (e.g., implemented by a processing circuit) that is asymmetrical relative to the sign of the error (i.e., the difference between the controlled variable and the setpoint, the controlled variable minus the setpoint). With reference to FIGS. 3 and 4, for example, supervisory controller 304 and/or controller 310 may include a processing circuit configured to respond to the error at a first rate when a first sign of the error is present and to respond to the error at a second rate when a second sign of the error is present. The response may include providing an adjusted control signal to a controller configured to control a plant that affects the climate condition. According to an exemplary embodiment, the first rate is slower than the second rate when the first sign of the error is associated with a high energy expenditure required to minimize the error relative to the energy expenditure required to minimize the error due to a second sign of the error. Causing the controller to respond to the error at the first rate can include delaying the control signal, changing the magnitude of the control signal, delaying an error signal provided to the control algorithm, adjusting the magnitude of the error signal provided to the control algorithm, or otherwise adjusting the system.

According to various exemplary embodiments, temperature sensor 420 can be a resistive sensor located in environment or any other type of temperature sensor. Actuator 422 may be an electric motor-based actuator, a pneumatic actuator, a hydraulic actuator, or any other type of device for controlling and positioning damper 426. VAV box 322 may additionally include fans, heating or cooling units, exhaust dampers, and return dampers for treating an air flow. Interfaces 402 and 406 can be or include analog inputs received by an A/D converter of controller 310 and/or can be or include digital inputs. Controller 310 includes circuitry and/or software for conditioning and interpreting the signals on inputs 402 and 406. Air flow sensor 424 provides a parameter such as an air flow parameter via link 412 to air flow input 402. The air flow parameter can represent the amount of air flow provided through damper 426 to an environment. Air flow sensor 424 can a differential pressure sensor which provides a factor related to air flow (volume/unit time). Air flow sensor 424 and its output can be used by controller 310 in its control algorithm to optimally reach a setpoint.

The control signal provided to the actuator may be a pulse width signal which causes actuator 422 to move forward, backward, or stay in the same position, and controller 310 may internally keep track of the position of actuator 422 as it is moved. Alternatively, actuator 422 may provide feedback indicative of its position, or the actuator signal may indicate the particular position to which actuator 422 should be moved.

While the systems and methods of the present application are primarily described with reference to temperature regulation systems including a VAV box, it should be appreciated that any plant (e.g., mechanical equipment used to affect a controlled variable) and any control loop thereof that incurs unequal costs depending on the sign of the error may be modified to include the systems and/or methods of the present disclosure. For example, in another exemplary embodiment, the systems and methods of the present disclosure can be utilized with air handling units (AHUs). These AHUs may have water-to-air heat exchangers for providing heating and cooling to an air stream. The flow of water through the coils is regulated by a hydronic valve, which is moved by an electric actuator connected to a controller. The valve position is adjusted to maintain the air temperature at the output of the heat exchangers within a specific range (i.e., setpoint). In yet other exemplary embodiments, the systems and methods of the present disclosure can be used with any type of control system and/or plant.

Figure 5:
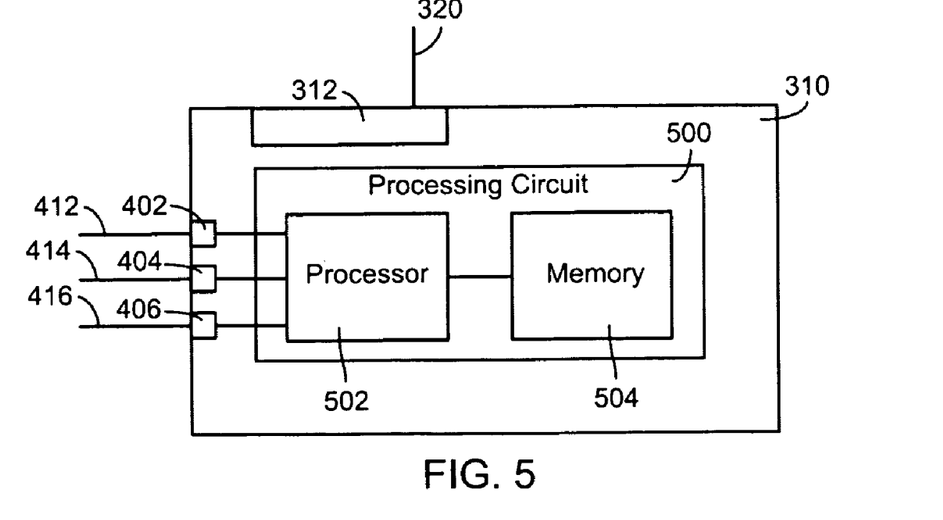
FIG. 5 is a more detailed block diagram of the controller of FIGS. 3-4, according to an exemplary embodiment.

Referring now to FIG. 5, a more detailed block diagram of controller 310 of FIGS. 3-4 is shown, according to an exemplary embodiment. Controller 310 is shown to include a processing circuit 500 including a processor 502 and a memory 504. Processing circuit 500 and processor 502 are shown as being configured to receive inputs from interfaces 402 and 406 and to provide an actuator output (e.g., a control signal) via interface 404. Processing circuit 500 can be a circuit containing one or more processing components (e.g., processor 502) or a group of distributed processing components. Processor 502 may be a general purpose processor, an application specific processor (ASIC), multiple processors, a field programmable gate array (FPGA), or other processing componentry. Processing circuit 500 is also shown to include memory 504. Memory 504 (e.g., memory unit, memory device, storage device, etc.) may be or include one or more devices for storing data and/or computer code for completing and/or facilitating the various processes described in the present disclosure. Memory 504 may include a volatile memory and/or a non-volatile memory. Memory 504 may include database components, object code components, script components, and/or any other type of information structure for supporting the various activities described in the present disclosure. For example, memory 504 may store data regarding the operation of a controller (e.g., previous setpoints, previous behavior patterns regarding used energy to adjust a current value to a setpoint, etc.). According to an exemplary embodiment, memory 504 is communicably connected to processor 502 (e.g., via a circuit or other connection) and includes computer code for executing one or more processes described herein; processor 502 being configured to execute the computer code.

Processing circuit 500 can be configured to receive commands or setpoints from a supervisory controller via communication interface 312. Referring also to FIG. 3, module 318 may be a controller or otherwise connected to various other components of the building area or zone and may provide information for controllers 310 or 314 or for other components of climate control system 300. Controller 310 can be a direct digital controller or any other type of controller configured to conduct the control activities described herein.

Figure 6A:
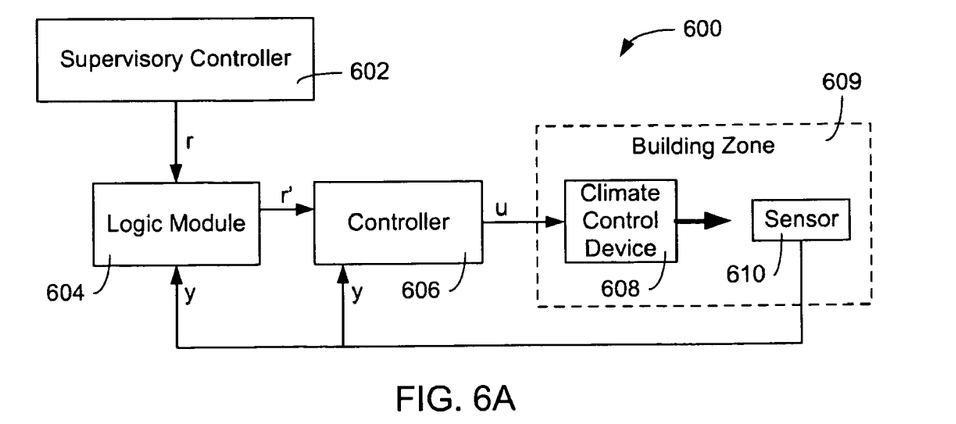
FIG. 6A is a block diagram of a control system, according to a first exemplary embodiment.
Figure 6B:
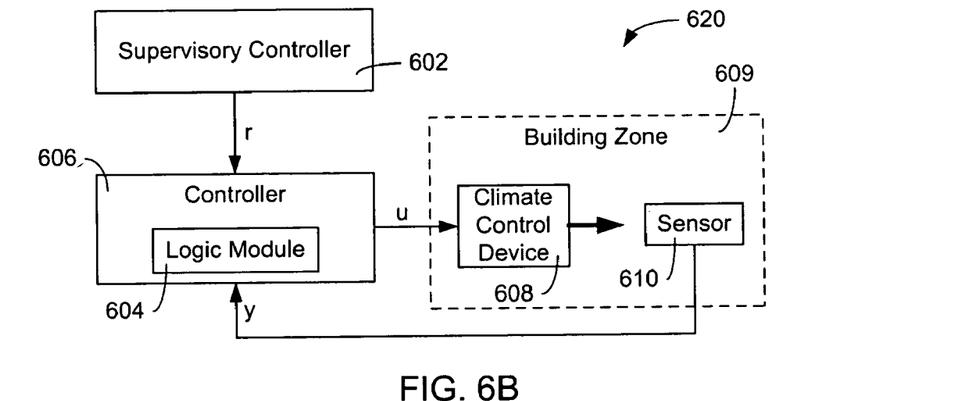
FIG. 6B is a block diagram of a control system, according to another exemplary embodiment.
Figure 6C:
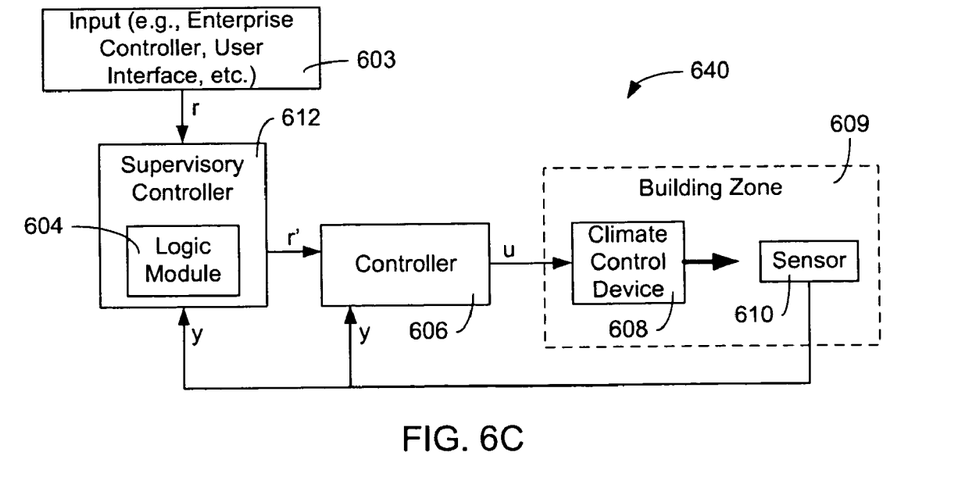
FIG. 6C is a block diagram of a control system, according to yet another exemplary embodiment.

Referring generally to FIGS. 6A-C, block diagrams of three exemplary systems for controlling a controlled variable (e.g., a climate condition) of a building zone are shown. The systems generally include a controller as described in FIGS. 3-5 (or otherwise), a climate control device (e.g., a plant), and a sensor. The systems may be generally configured to control the controlled variable in a way that minimizes an error between the controlled variable and a setpoint relating to the controlled variable. A logic module included in each system is preferably configured to modify the transient response of the controller so that the controlled variable (e.g., temperature) stays for longer on the side of the setpoint where less energy is needed than it does on the other side. According to an exemplary embodiment, this asymmetrical strategy will result in a penalty to comfort conditions but will only occur during transient periods in the form of slower responses and will not affect eventual steady-state conditions.

With reference to FIG. 6A, a block diagram of an exemplary control system 600 including a logic module 604, controller 606, climate control device 608 (e.g., a cooling device, a heating device, a VAV box, an AHU, etc.), and sensor 610 is shown. A supervisory controller 602 is communicably coupled to logic module 604 and provides a desired setpoint r to logic module 604. Logic module 604 may also receive an input from sensor 610 regarding a current value y of a controlled variable of the building zone associated with control system 600 (e.g., temperature). Using inputs r and y, logic module 604 may calculate an error e (e.g., using e=r−y) representing the difference between the inputs.

One way to modify the transient response of controller 606 is to modify the error signal provided to controller 606 only when the controlled variable is on one side of the setpoint (and to not modify the error when the controlled variable is on the other side of the setpoint). The error e can be modified by a function f(e). According to one exemplary embodiment, one function to modify the error may be $f(e)=\lambda *e$, where $\lambda$ is a tuning constant that would affect responsiveness and govern the trade-off between control performance and energy savings.

The modified error function when the sign is negative might be, for example, $$f(e) = \frac{1}{120|e|^3},$$

with the exponent of 3 providing a greater penalty to the transient response when the error is closer to the setpoint. Because the error signal of controller 606 is likely calculated internally, as in the embodiment shown in FIG. 6A, the modified error signal determined by f(e) can be used to obtain a modified setpoint r' (e.g., r'=f(e)+y) that is provided to controller 606. Controller 606 may receive the modified setpoint r' which controller 606 may not be able to differentiate from an unmodified setpoint. Accordingly, controller 606 provides a control signal u to climate control device 608 based on the received modified setpoint r'.

Climate control device 608 may receive the control signal u and affect the controlled variable (e.g., a climate condition such as temperature) of building zone 609 based on the control signal u. Sensor 610 may be used to detect the current value y of the controlled variable and provide the value y to logic module 604 and/or controller 606. It should be noted that controller 606 and the climate control device 608 may include an internal loop that operates with a faster time constant than the loop involving supervisory controller 602 and logic module 604.

Referring now to FIG. 6B, control system 620 is shown with logic module 604 as part of controller 606, according to an exemplary embodiment. Controller 606 may receive setpoint r and current value y and provide the values to logic module 604. Logic module 604 may then determine an error e and modify e or otherwise delay the response of controller 606 if the sign of e indicates that the modification is appropriate, and controller 606 may provide a control signal u to climate control device 608 based on the calculations of logic module 604.

Referring now to FIG. 6C, control system 640 is shown with a supervisory controller 612 that includes logic module 604 and is shown coupled to controller 606. Supervisory controller 612 may be part of a facility system or subsystem and may generally be configured to provide varying levels of supervisory features and building management features. Supervisory controller 612 may be coupled to various components of the building zone (e.g., an input 603 from a building system component such as an enterprise controller, user interface, or otherwise) and may accept inputs regarding a setpoint r or create a setpoint r based on a schedule, user input, or another control strategy. Supervisory controller 612 may determine a modified error e based on the setpoint r and the received current value y of the controlled variable. The modified error may be provided to controller 606 (if controller 606 is configured to accept such an input) or the modified error can be used to create a modified setpoint r' provided to controller 606.

Figure 7A:
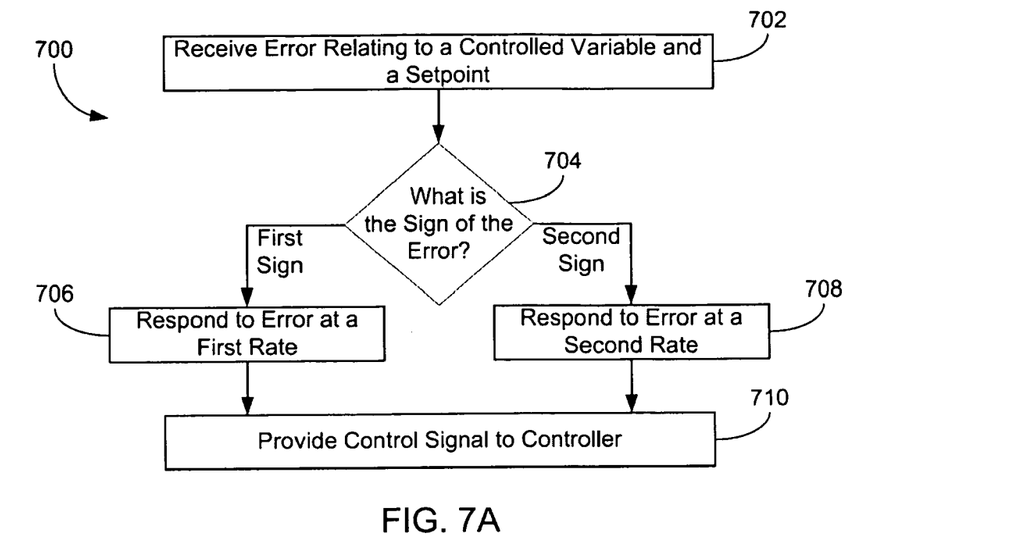
FIG. 7A is a flow chart of a process for controlling a controlled variable of a building zone, according to an exemplary embodiment.

Referring now to FIG. 7A, a flow chart of a process 700 for controlling a controlled variable of a building zone is shown, according to an exemplary embodiment. A controller, logic module, or other device having a processing circuit may calculate or receive an error relating to a controlled variable and a setpoint (step 702). Depending on the difference between the setpoint and the actual value for the controlled variable, the error will have a positive or negative sign. Process 700 further includes determining the sign of the error (step 704). According to an exemplary embodiment, a first sign of the error is associated with a high energy expenditure required to minimize the error relative to the second sign of the error. For example, for a cooling system, the first sign of the error may represent a positive difference between a temperature and the setpoint. As another example, for a heating system, the first sign of the error may represent a negative difference between the temperature and the setpoint.

If the error is of a first sign (e.g., the sign that corresponds with relatively high energy expenditure), process 700 is shown to respond to the error at a first rate (step 706) and to provide a modified control signal to a controller (step 710). If the error is of a second sign, process 700 may respond to the error at a second rate (step 708) and/or provide an unmodified control signal to the controller (step 710). As the first sign corresponds with a high energy expenditure relative to the second sign, the first rate is slower than the second rate. The first rate being slower than the second rate allows the correction in the error to be less dramatic and energy intensive, which may compensate for the higher energy expenditure normally associated with correction of an error of the first sign.

The determination as to which error and sign represent a greater energy expenditure may be made based on user input, past histories (e.g., observing patterns of the setpoint adjustment), or other properties related to the building zone. The determination may occur in "real time" (e.g., the control loop may monitor energy expenditure and determine which changes to the controlled variable result in greater energy usage), may be predetermined, or may occur at any point before or during process 700.

Figure 7B:
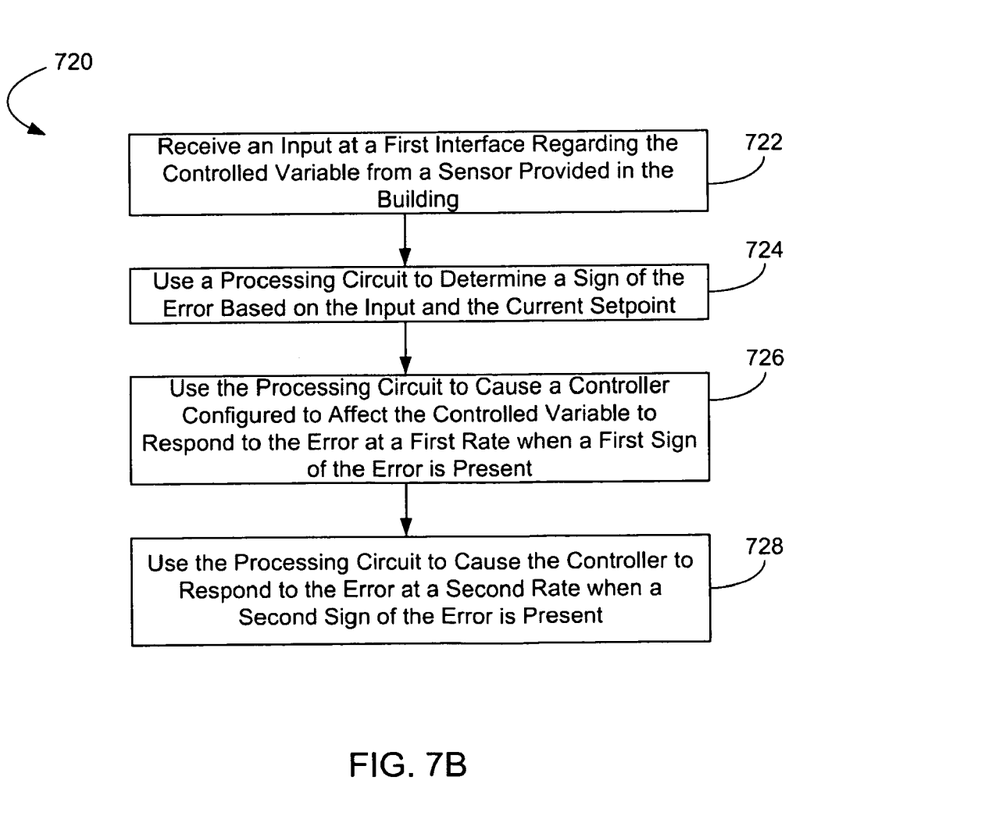
FIG. 7B is a flow chart of a process for controlling a controlled variable of a building zone, according to another exemplary embodiment.

Referring now to FIG. 7B, a flow chart of a process 720 for controlling a controlled variable of a building zone is shown, according to an exemplary embodiment. Process 720 may generally be configured to continuously minimize an error between the controlled variable and a setpoint (both of which may be dynamically changing). Process 720 is shown to include receiving an input at a first interface regarding the controlled variable from a sensor provided in the building (step 722). Process 720 is further shown to include using a processing circuit to determine a sign of the error based on the input and the current setpoint (step 724). Process 720 is yet further shown to include using the processing circuit to cause a controller configured to affect the controlled variable to respond to the error at a first rate when a first sign of the error is present (step 726). The processing circuit is then used to cause the controller to respond to the error at a second rate when a second sign of the error is present (step 728), the first rate being slower than the second rate. According to an exemplary embodiment, the first sign of the error is associated with a high energy expenditure required to minimize the error relative to an energy expenditure required to minimize the error.

Causing the controller to respond to the error can include providing an adjusted control signal to the controller and/or a control loop controlled by the controller. The control loop can include a plant configured to affect the controlled variable. According to some exemplary embodiments, providing an adjusted control signal to the plant includes delaying a control signal calculated to address the error. Where the plant is part of a cooling system, the first sign of the error can represent a positive difference between a climate condition such as temperature (i.e., the controlled variable) and the setpoint. Where the plant is part of a heating system, the first sign of the error can represent a negative difference between the climate condition and the setpoint (e.g., when the error equals the climate condition minus the setpoint). As mentioned with respect to previous figures, the processing circuit can be integrated into a local controller for the plant or integrated into a supervisory controller that provides the setpoint to the local controller. In some embodiments the processing circuit can be configured to cause the controller to affect the climate condition at the slower rate by modifying the setpoint provided to the local controller when the first sign of the error is present. In some other exemplary embodiments, the processing circuit can be configured to respond to the error at the first sign by reducing the error signal's magnitude.

Figure 8:
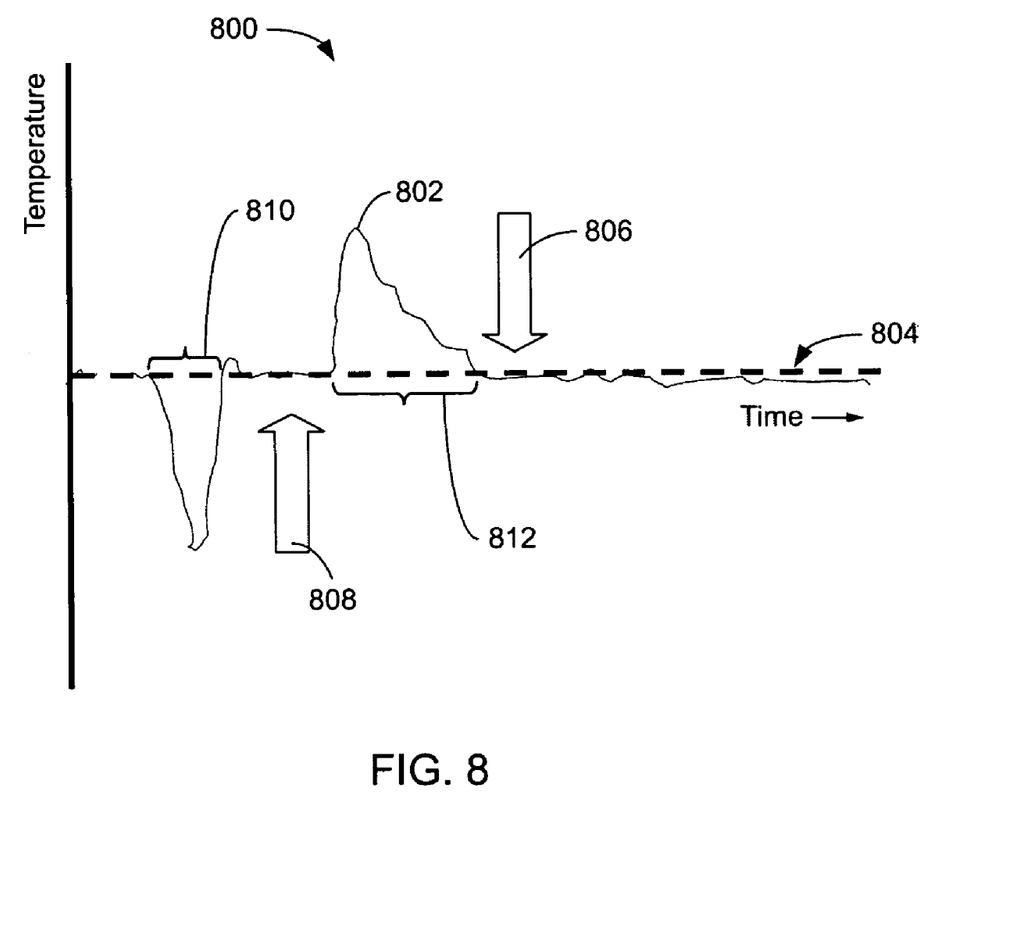
FIG. 8 is a graph illustrating corrections for errors between a controlled variable and a setpoint, according to an exemplary embodiment.

Referring to FIG. 8, a graph 800 is shown to illustrate the differences in transient response to different types of errors provided by the systems and methods of the present disclosure, according to an exemplary embodiment. Graph 800 is shown to include a controlled variable 802 (e.g., a climate condition such as temperature) and desired setpoint 804 of the climate condition. Area 806 above setpoint 804 represents values of the controlled variable higher than the setpoint, resulting in an error having a positive sign, while the area 808 below setpoint 804 represents values of the controlled variable below the setpoint, resulting in an error having a negative sign. Area 806 above setpoint 804 may represent a controlled variable which requires more energy for a system to drive to the setpoint 804 (i.e., minimize the error) relative to the energy needed to drive a controlled variable in area 808 to setpoint 804.

In graph 800, controlled variable 802 is shown dipping significantly below setpoint 804 at time 810. Because less energy is required to raise controlled variable 802 to setpoint 804, in the example being discussed, a normal response may be issued by the system to expediently bring controlled variable 802 to setpoint 804 as shown. At time 812, controlled variable 802 is shown rising significantly above setpoint 804. Because more energy is required to expediently lower controlled variable 802 to setpoint 804, the system may be configured to delay its response to the error between controlled variable 802 and setpoint 804 at time 812. The result of this delayed response is illustrated in graph 800, with controlled variable 802 lowering to setpoint 804 at a slower pace relative to the correction conducted at time 810. Under certain conditions, such a control strategy is estimated to result in a five percent energy savings with little impact on comfort conditions.

It should be noted that the error sign requiring less energy to address may be associated with a passive response by the building. For example, in cooling climates which have cooled the actual temperature to above the setpoint, the system does not actively heat to correct the error, but rather ceases to cool or slows its cooling activity to "heat" the building zone.

The systems and methods as shown in the various exemplary embodiments are illustrative only. Although only a few embodiments have been described in detail in this disclosure, many modifications are possible. For example, the systems and methods of the present application may be adapted to change a response of a nonlinear system to be more linear. For example, a heating coil in an AHU takes less time to heat up than to cool down. A function may be applied such that an equal amount of time is taken to heat up and cool down the coil (e.g., a function to slow the cooling down process). The modified setpoint and/or the modified error discussed throughout this disclosure may be used to implement this linearization method and to improve control performance.

By way of further example, the position of elements may be reversed or otherwise varied and the nature or number of discrete elements or positions may be altered or varied. All such modifications are intended to be included within the scope of the present disclosure. The order or sequence of any process or method steps may be varied or re-sequenced according to alternative embodiments. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Other substitutions, modifications, changes, and omissions may be made in the design, operating conditions and arrangement of the exemplary embodiments without departing from the scope of the present disclosure.

Embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

What is claimed is:

1. A method for controlling a controlled variable of a building zone to minimize an error between the controlled variable and a setpoint, the method comprising:
   receiving an input at a first interface regarding the controlled variable from a sensor provided in the building;
   using a processing circuit to determine a sign of the error based on the input and the setpoint;
   using the processing circuit to cause a controller configured to affect the controlled variable to respond to the error at a first rate in response to a determination that a first sign of the error is present; and
   using the processing circuit to cause the controller to respond to the error at a second rate, the first rate slower than the second rate, in response to a determination that a second sign of the error is present,
      wherein the first sign of the error is associated with a high energy expenditure required to minimize the error relative to the second sign,
      wherein using the processing circuit to provide the slower first rate comprises reducing the magnitude of an error signal to be used by the controller when the first sign of the error is present, and refraining from reducing the magnitude of the error signal to be used by the controller when the second sign of the error is present,
      wherein the processing circuit delays a feedback control strategy of the controller when the first sign of the error exists by conducting the magnitude of the error signal reduction.

2. The method of claim 1, wherein the processing circuit is integrated in the controller.

3. The method of claim 1, wherein the processing circuit is integrated in a supervisory controller that provides a setpoint to the controller.

4. The method of claim 1, wherein the controller is part of a cooling system and wherein the first sign of the error represents a positive difference between the climate condition and the setpoint.

5. The method of claim 1, wherein the controller is part of a heating system and wherein the first sign of the error represents a negative difference between the climate condition and the setpoint.

6. A system for controlling a temperature in a building zone relative to a setpoint to minimize a difference between the temperature and the setpoint, wherein the difference between the temperature and the setpoint is of a first error sign or a second error sign, the system comprising:
   a plant configured to affect the temperature of the building zone;
   a controller configured to provide a control signal to the plant according to a control strategy configured to cause the temperature to approach the setpoint, wherein the existence of the first error sign results in a greater energy expenditure relative to the second error sign; and
   a processing circuit that delays the control strategy when the first error sign exists,
      wherein the processing circuit causes the system to respond to errors of the first error sign at a first rate and errors of the second error sign at a second rate, the first rate slower than the second rate,
      wherein the processing circuit delays the control strategy when the first error sign exists by reducing the magnitude of an error signal to be used by the controller in a feedback control strategy, wherein the processing circuit is further configured to refrain from reducing the magnitude of the error signal to be used by the controller when the second error sign exists.

7. The system of claim 6, wherein the processing circuit is part of at least one of:

(a) the controller,
(b) a supervisory controller, and
(c) a device between the supervisory controller and the controller.

* * * * *